US00RE44771E

(19) United States
(12) Reissued Patent
Sprinkle et al.

(10) Patent Number: US RE44,771 E
(45) Date of Reissued Patent: Feb. 25, 2014

(54) REAR-MOUNTED IMPLEMENT MOUNTING SYSTEM

(75) Inventors: David Laverne Sprinkle, Warrenton, GA (US); Daniel R. Fuzzen, Welland (CA); Judith Fuzzen, legal representative, Welland (CA)

(73) Assignee: Deere & Company, Moline, IL (US)

(21) Appl. No.: 11/401,494

(22) Filed: Apr. 10, 2006

Related U.S. Patent Documents

Reissue of:
(64) Patent No.: 6,725,583
Issued: Apr. 27, 2004
Appl. No.: 10/041,830
Filed: Oct. 19, 2001

(51) Int. Cl.
*E02F 3/96* (2006.01)

(52) U.S. Cl.
USPC ..... 37/468; 37/403; 414/723; 414/686; 172/481

(58) Field of Classification Search
USPC ..... 172/272, 274, 275, 481; 37/468, 403, 37/408, 409; 414/723, 724, 686, 687, 694
See application file for complete search history.

(56) References Cited

U.S. PATENT DOCUMENTS

| | | | | | |
|---|---|---|---|---|---|
| 3,220,487 | A | * | 11/1965 | Pilch | 172/274 |
| 3,554,396 | A | | 1/1971 | Demkiw | 214/140 |
| 3,732,996 | A | * | 5/1973 | Bauer | 414/815 |
| 3,844,425 | A | * | 10/1974 | Bailey | 414/686 |
| 3,863,786 | A | | 2/1975 | Frank | 214/131 A |
| 4,033,469 | A | | 7/1977 | Frank | 214/131 A |
| 4,034,998 | A | * | 7/1977 | Iijima et al. | 280/461.1 |
| 4,043,470 | A | * | 8/1977 | Pilch | 414/686 |
| 4,056,250 | A | * | 11/1977 | Uchiyama | 248/674 |
| 4,142,642 | A | * | 3/1979 | Myers | 414/719 |
| 4,163,627 | A | | 8/1979 | Schnittjer et al. | 414/686 |
| 4,208,162 | A | * | 6/1980 | Neitzel | 414/686 |
| 4,318,662 | A | * | 3/1982 | Erickson et al. | 414/686 |
| 4,368,899 | A | | 1/1983 | Smalley et al. | 280/477 |
| 4,661,036 | A | * | 4/1987 | Horsch | 414/686 |
| 4,720,234 | A | * | 1/1988 | Stralow | 414/686 |
| 4,735,547 | A | * | 4/1988 | Wagner et al. | 414/686 |

(Continued)

FOREIGN PATENT DOCUMENTS

| | | | |
|---|---|---|---|
| DE | 3922870 | * | 1/1990 |
| DE | 3922870 A1 | * | 1/1990 |
| EP | 270504 A1 | * | 6/1988 |

OTHER PUBLICATIONS

Brochure "John Deere 5000 TEN Series Tractors 45 to 65 PTO—Horsepower," 20 pages.

(Continued)

*Primary Examiner* — Jamie L McGowan

(57) ABSTRACT

A rear-mounted implement mounting system includes semicylindrical seats open upwardly and mounted on a lower back portion of a utility vehicle chassis that receive bar members located on a facing lower part of the rear-mounted implement. The utility vehicle chassis further includes semicylindrical receivers open in a rearward direction and adjacent cylinder portions open laterally. The receivers guide cylindrical bosses, located on an upper portion of the rear-mounted implement, into alignment with the cylinder portions, when the rear-mounted implement is pivoted upwardly by extending the boom cylinder of the rear-mounted implement. Connecting pins can be slipped through the cylindrical bosses and cylinder portions to lock the rear-mounted implement to the utility vehicle chassis. An operator remaining in the vehicle cab or operator station can easily operate the mounting system.

12 Claims, 6 Drawing Sheets

(56) References Cited

U.S. PATENT DOCUMENTS

| | | | | |
|---|---|---|---|---|
| 4,737,067 | A | 4/1988 | Samejima et al. | 414/686 |
| 4,798,511 | A | 1/1989 | Kaczmarczyk et al. | 414/686 |
| 4,817,728 | A | 4/1989 | Schmid et al. | 172/273 |
| 4,846,624 | A | 7/1989 | Hohn | 414/723 |
| 5,026,247 | A | 6/1991 | Zimmerman | 414/703 |
| 5,064,339 | A | 11/1991 | Ahlers | 414/687 |
| 5,135,347 | A | 8/1992 | Kaczmarczyk et al. | 414/686 |
| 5,224,816 | A | 7/1993 | Kaczmarczyk et al. | |
| 5,232,330 | A | 8/1993 | Rae et al. | 414/686 |
| 5,252,022 | A | 10/1993 | Culp et al. | 414/723 |
| 5,388,950 | A | 2/1995 | Schmahl et al. | |
| 5,620,297 | A | 4/1997 | Mahaney | 414/686 |
| 5,927,665 | A * | 7/1999 | Grabnic | 248/200 |
| 5,967,737 | A | 10/1999 | Kraske et al. | 414/694 |
| 6,446,367 | B1 * | 9/2002 | Muramoto et al. | 37/410 |
| 6,729,431 | B2 | 5/2004 | Osuga et al. | 180/312 |

OTHER PUBLICATIONS

Nichols, Herbert, L., Jr., "Moving the Earth," 1976, cover pages, pp. 13-115 and 13-116.
Gehl Brochure "Skid Loader Attachments," 1997, 2 pages.
Brochure "John Deere 4000 Series Tractors," 4 pages.
Brochure: "John Deere 5000 TEN Series Tractors 45 to 65 PTO—Horsepower," 20 pp.
Brochure: "John Deere 4000 Series Tractors", 4 pp.

* cited by examiner

REAR-MOUNTED IMPLEMENT MOUNTING SYSTEM

Matter enclosed in heavy brackets [ ] appears in the original patent but forms no part of this reissue specification; matter printed in italics indicates the additions made by reissue.

TECHNICAL FIELD OF THE INVENTION

The present invention relates to utility vehicles such as tractors. Particularly, the invention relates to a tractor that is provided with a detachable rear-mounted implement, such as a backhoe.

BACKGROUND OF THE INVENTION

Utility vehicles, such as compact tractors, are configured to accept a plurality of rear-mounted implements. Such implements include mower decks, tillers, cultivators, trenchers and backhoes. For attaching a rear-mounted implement, a mounting system is required. A mounting system must allow for attachment and detachment of the rear-mounted implement to the utility vehicle such that other rear-mounted implements can be used alternatively. A rigid and secure rear-mounted implement mounting system is required.

Most backhoe mounting systems in use today require the operator to be on the ground, out of the vehicle cab or operator station, to attach the backhoe attachment, thus exposing the operator to certain inconveniences and hazards inherent in manipulating such a large and heavy attachment. These mounting systems are cumbersome and complex.

The present inventors have recognized the desirability of providing a rear-mounted implement mounting system that is rigid and secure but which also is easily attached and detached. The present inventors have recognized the desirability of providing a rear-mounted implement mounting system that can be engaged to a utility vehicle by the operator without leaving the vehicle cab or operator station.

SUMMARY OF THE INVENTION

The invention provides a rear-mounted implement mounting system for a utility vehicle, including a rear-mounted implement, that comprises a first connection arranged between the utility vehicle and the rear-mounted implement, the first connection being engageable in a first direction and restrained along a second direction, the second direction substantially perpendicular to the first direction, and a second connection between the utility vehicle and the rear-mounted implement, the second connection being engaged in a tangential direction rotationally about the first connection, and thereafter restrained along the tangential direction.

Advantageously, the first direction is a substantially vertical direction and the second direction is a substantially horizontal direction, although the invention encompasses other directions angled to the vertical and horizontal directions. The invention allows for a setting of the first connection and a pivoting of the rear-mounted implement to set the second connection, engaged in the tangential direction, and once set, restrained in the tangential direction.

The present invention provides a rear-mounted implement mounting system for a utility vehicle that includes a set of lower hooks or seats and a set of upper receivers, located on a chassis of the utility vehicle. The rear-mounted implement includes round bar features that are configured to be inserted into the lower hooks, and boss features that are configured to be engaged to the upper receivers. Locking devices can be engaged to the bosses and receivers to lock the rear-mounted implement to the utility vehicle.

According to one aspect of the invention, in order to mount the rear-mounted implement, the utility vehicle is backed up to a detached rear-mounted implement, and the operator connects the hydraulic supply lines of the rear-mounted implement to the utility vehicle. Using hydraulic power, the round bar features on the rear-mounted implement are set above the lower hooks on the utility vehicle. The rear-mounted implement is then lowered to position the bar features into the books using lateral stabilizers of the rear-mounted implement. The boom cylinder of the rear-mounted implement is then extended which rotates the entire rear-mounted implement base into a mounting position. The boss features on the rear-mounted implement contact specially machined receivers, which force the rear-mounted implement into its final attached position. The operator can then easily insert and lock-in mounting pins by hand. All of these tasks can be accomplished from the operator's seat.

The present invention allows the operator to attach and detach a rear-mounted implement without the need to exit the utility vehicle cab. This enhances productivity and safety of the operator. Secondly, the mounting system is robust, and securely mounts the rear-mounted implement to the utility vehicle. Thirdly, the number of parts required to assemble the mounting system is low. This further reduces complexity of the mounting system, and increases the robustness of the mounting system. The mounting system allows mounting of the rear-mounted implement to the utility vehicle even if the rear-mounted implement is stored on unlevel ground or dirt.

Numerous other advantages and features of the present invention will become readily apparent from the following detailed description of the invention and the embodiments thereof, from the claims and from the accompanying drawings.

DETAILED DESCRIPTION OF THE PREFERRED EMBODIMENTS

Figure 1:
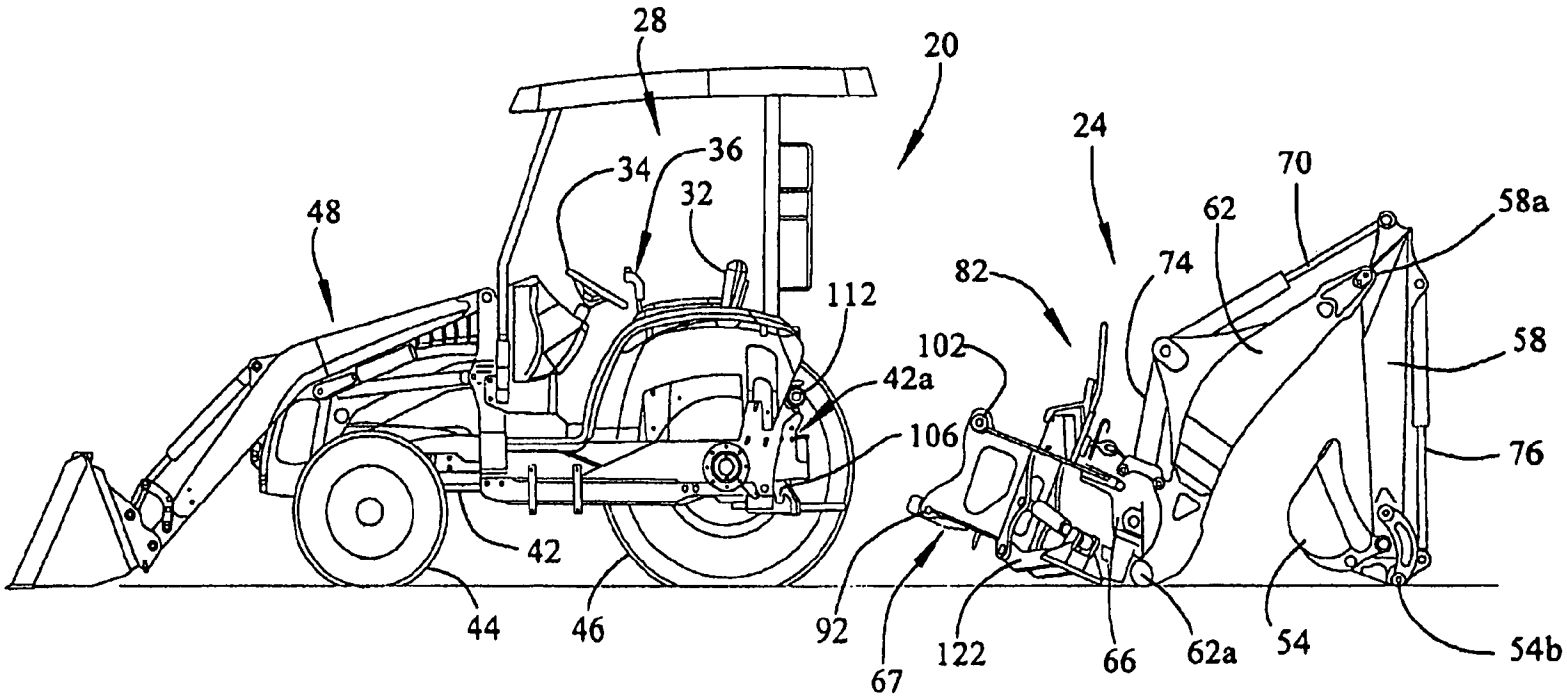
FIG. 1 is a fragmentary elevational view of a tractor and a backhoe attachment with a foreground rear wheel removed for viewing portions behind the wheel.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a utility vehicle 20 and a rear-mounted implement, such as a backhoe attachment 24. The utility vehicle 20 includes a cab or operator's station 28 including a seat 32, a steering wheel 34, and controls 36. The cab is supported on a chassis 42 that is supported on front wheels 44 and larger rear wheels 46. The foreground rear wheel is removed in FIG. 1 to view portions behind the wheel. The utility vehicle 20 can be equipped with a front mounted loader assembly 48.

The backhoe attachment 24 includes a bucket 54, a distal arm or dipperstick 58, an intermediate arm or boom arm 62, a swivel arm or swivel tower 66 and a base assembly or mainframe 67. The distal arm 58 can be pivoted about a pivot point 58a with respect to the intermediate arm 62 by a hydraulic cylinder 70. The intermediate arm 62 can be pivoted with respect to the swivel arm 66 by a hydraulic cylinder or boom cylinder 74. The swivel arm 66 can be rotated about a vertical axis with respect to the base assembly 67. The bucket 54 can be curled with respect to the distal arm 58 by a hydraulic cylinder 76. The operation of the hydraulic cylinders is by rear-mounted controls 82.

The chassis 42 includes a rear-mounted implement mounting structure 42a located on a rear end of the chassis 42, facing the backhoe attachment 24. The backhoe attachment base assembly 67 includes features that engage the rear-mounted implement mounting structure 42a. The rear-mounted implement mounting structure 42a and the base assembly 67 are both substantially mirror-image symmetrical about a vertical, longitudinal plane.

Figures 2, 2A:
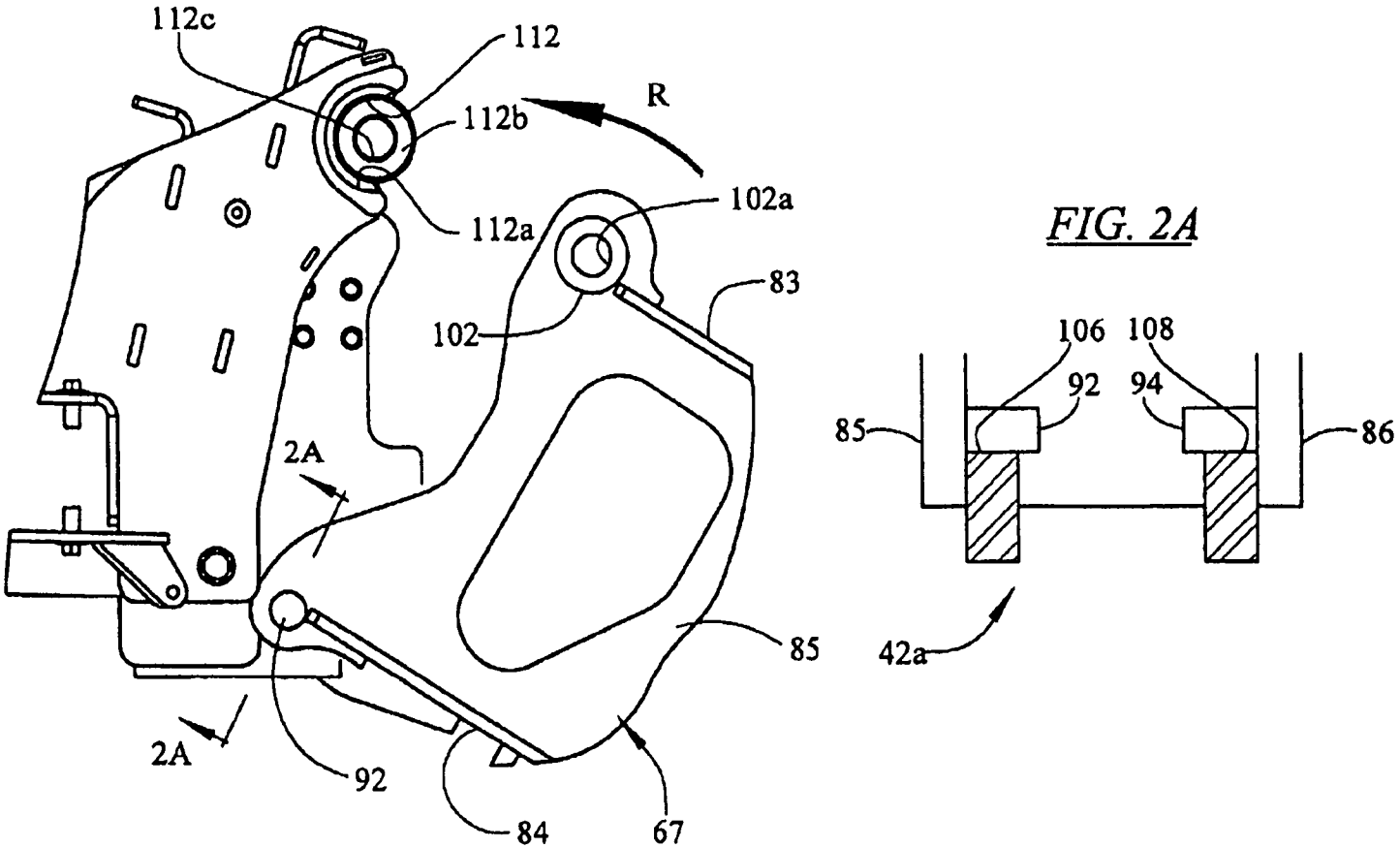
FIG. 2 is an enlarged fragmentary elevational view of an interface between the tractor and the backhoe attachment.
FIG. 2A is a fragmentary sectional view taken generally along line 2A-2A of FIG. 2.
Figure 3:
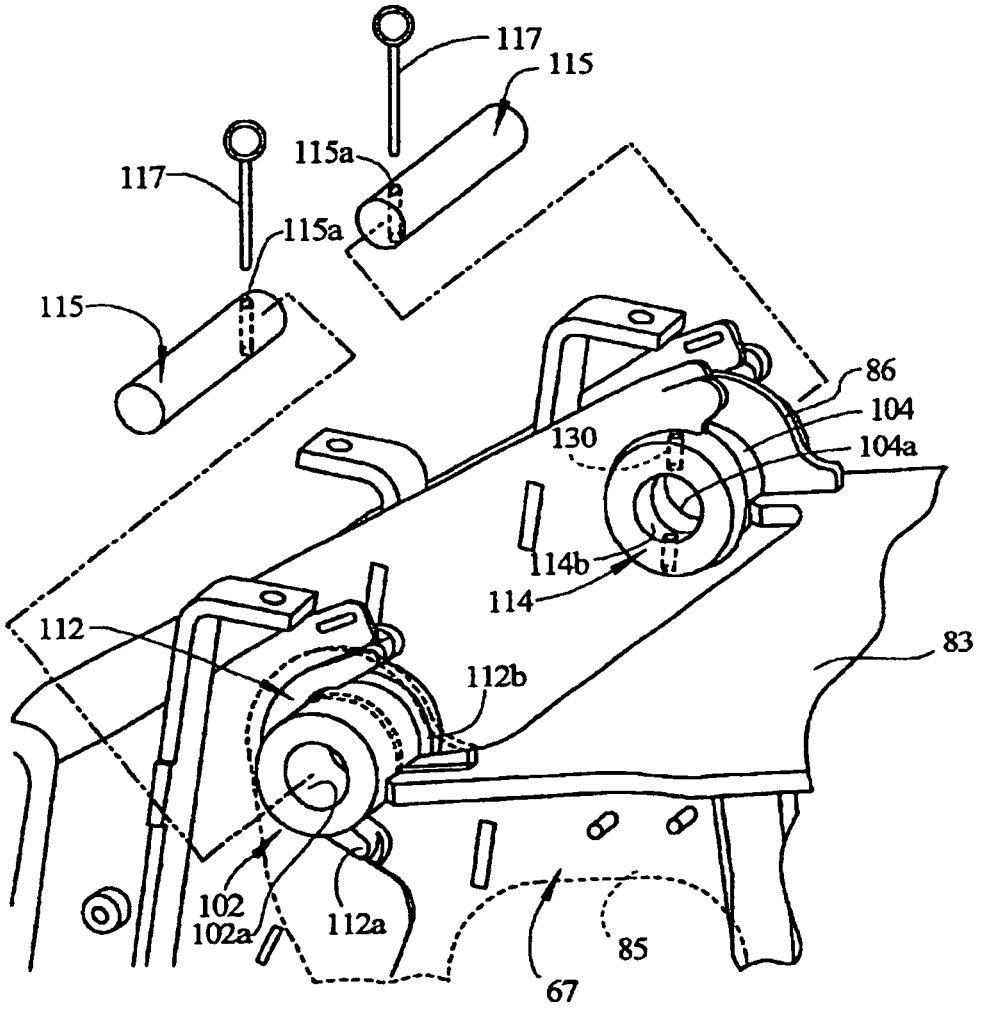
FIG. 3 is an enlarged fragmentary perspective view of the mounting arrangement of the backhoe attachment to the tractor.

As illustrated in FIGS. 2, 2A and 3, the backhoe attachment base assembly 67 includes horizontal upper and lower plates 83, 84 and side plates 85, 86. The side plate 85 is shown in phantom in FIG. 3 to allow viewing of the receiver 112. Laterally directed, round bars 92, 94 extend on opposite sides of the base assembly 67 on a bottom thereof (FIG. 2A). As illustrated in FIG. 3, the base assembly 67 includes cylindrical bosses 102, 104 located substantially above the round bars 92, 94 and extending laterally on opposite sides of the base.

The mounting structure 42a includes hooks or seats 106, 108, open upwardly and located on opposite lateral sides of the rear portion of the chassis 42 of the utility vehicle. The seats 106, 108 are sized to receive the round bars 92, 94 therein. The mounting structure 42a further includes semicylindrical receivers 112, 114 that are sized and shaped to receive the bosses 102, 104 therein and guide the bosses into a mounting position. The receivers 112, 114 are open horizontally toward the backhoe attachment.

FIG. 2 illustrates in an enlarged view, the partial engagement of the base assembly 67 of the backhoe attachment 24 to the mounting structure 42a. The round rods 92, 94 are already fit into the seats 106, 108. The bosses 102, 104 are being rotated upwardly about the rods 92, 94 to engage the receivers 112, 114 in a tangential direction. The receivers 112, 114 include semi-circular rim portions 112a, 114a and pin receiving cylinder portions 112b, 114b. The bosses 102, 104 include central bores 102a, 104a. When a boss 102, 104 is fit into the receiver rim portions 112a, 114a the bores 102a, 104a aligns with the bores 112c, 114c as the bosses 102, 104 fit coaxially against the cylinder portions 112b, 114b.

As shown in FIG. 3, cylindrical connection pins 115 fit through the central bores 102a, 104a of the bosses 102, 104, respectively, and through the adjacent bores 112c, 114c of the cylinder portions 112b, 114b of the receivers 112, 114.

The cylindrical portions 112b, 114b include a radial through-hole 130 penetrating completely through the cylinder portions 112b, 114b in order to receive a retainer pin 117. Once the respective connector pin 115 is pushed through both the bosses 102, 104 and the respective cylinder portions 112b, 114b, a retainer pin 117 is inserted through both the cylinder portions 112b, 114b and through a through-hole 115a of the respective connector pin 115 to retain the connector pins 115 in place. This locks the backhoe attachment to the utility vehicle.

Figure 4B:
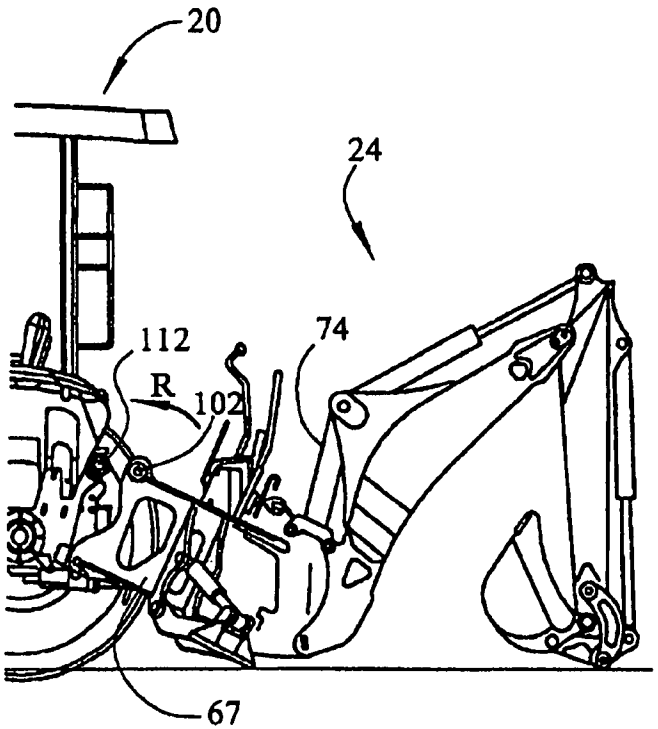
FIGS. 4A through 4D are fragmentary elevational views of the tractor and the backhoe attachment in progressive stages of attachment.
Figure 4A:
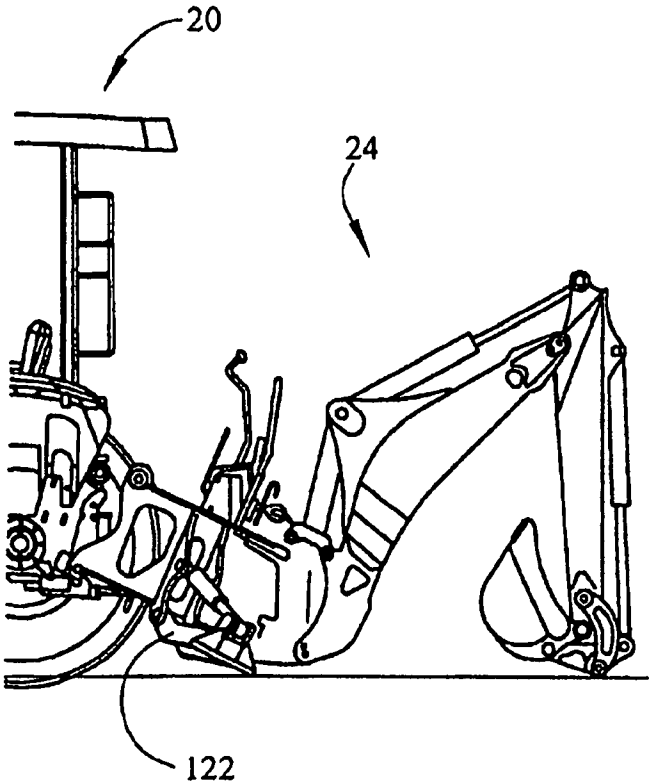

FIG. 4A illustrates the first step of attachment of the backhoe attachment 24 to the utility vehicle 20. The round bars 92, 94 are positioned above the hooks 106, 108. In order to elevate and position the round bars 92, 94 above the seats 106, 108, the stabilizers 122 (one shown in FIG. 4A) that are located on opposite lateral sides of the backhoe attachment 24, are lowered as necessary. The stabilizers can then be raised such that the round bars are lowered to fit snuggly within the seats.

FIG. 4B illustrates the next step in the attachment of the backhoe attachment 24 to the utility vehicle 20 wherein the hydraulic cylinder 74 is extended to pivot the base assembly 67 with respect to the utility vehicle 20 to mate the bosses 102, 104 to the receivers 112, 114. The base assembly 67 is rotated in the direction R. The rotation also drives the round bars 92, 94 into the seats 106, 108.

Figure 4D:
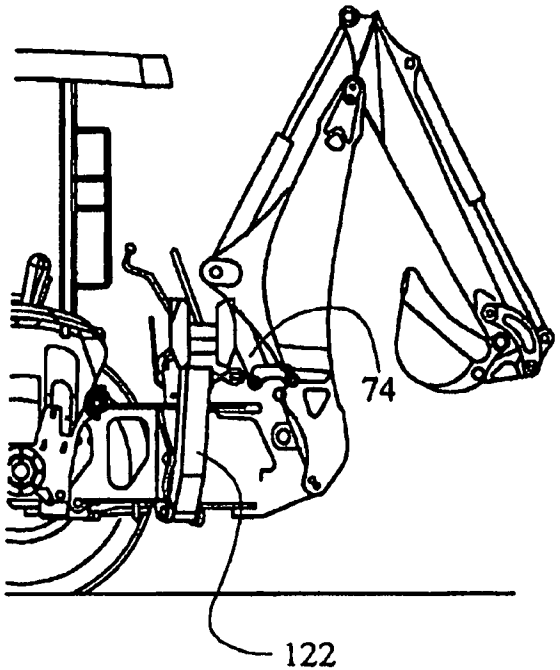
Figure 4C:
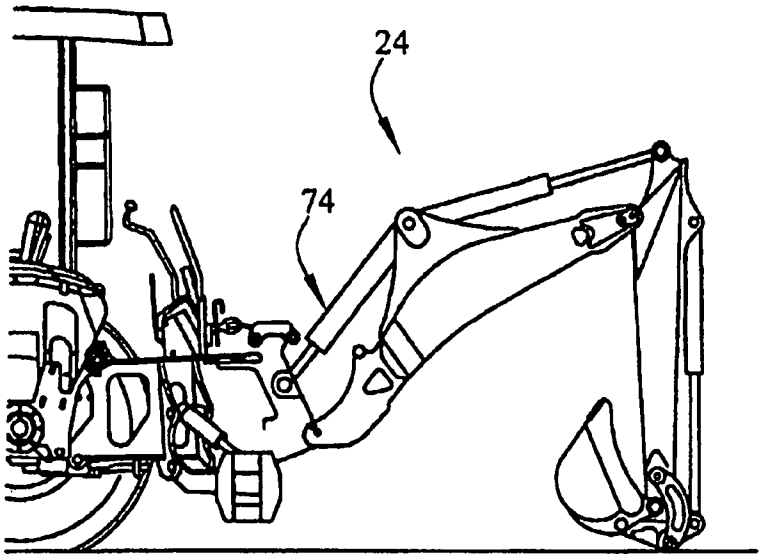

FIG. 4C shows the complete attachment of the backhoe attachment 24. The round bars 92, 94 are completely set into the seats 106, 108. The bosses 102, 104 are set into the receivers 112, 114. Connection pins (shown in FIG. 3) have been inserted through the bosses 102, 104 and the receivers 112, 114 are locked in place.

FIG. 4D shows the stabilizers 122 raised and the hydraulic cylinder 74 retracted to make the utility vehicle ready for ground travel.

Figure 5:
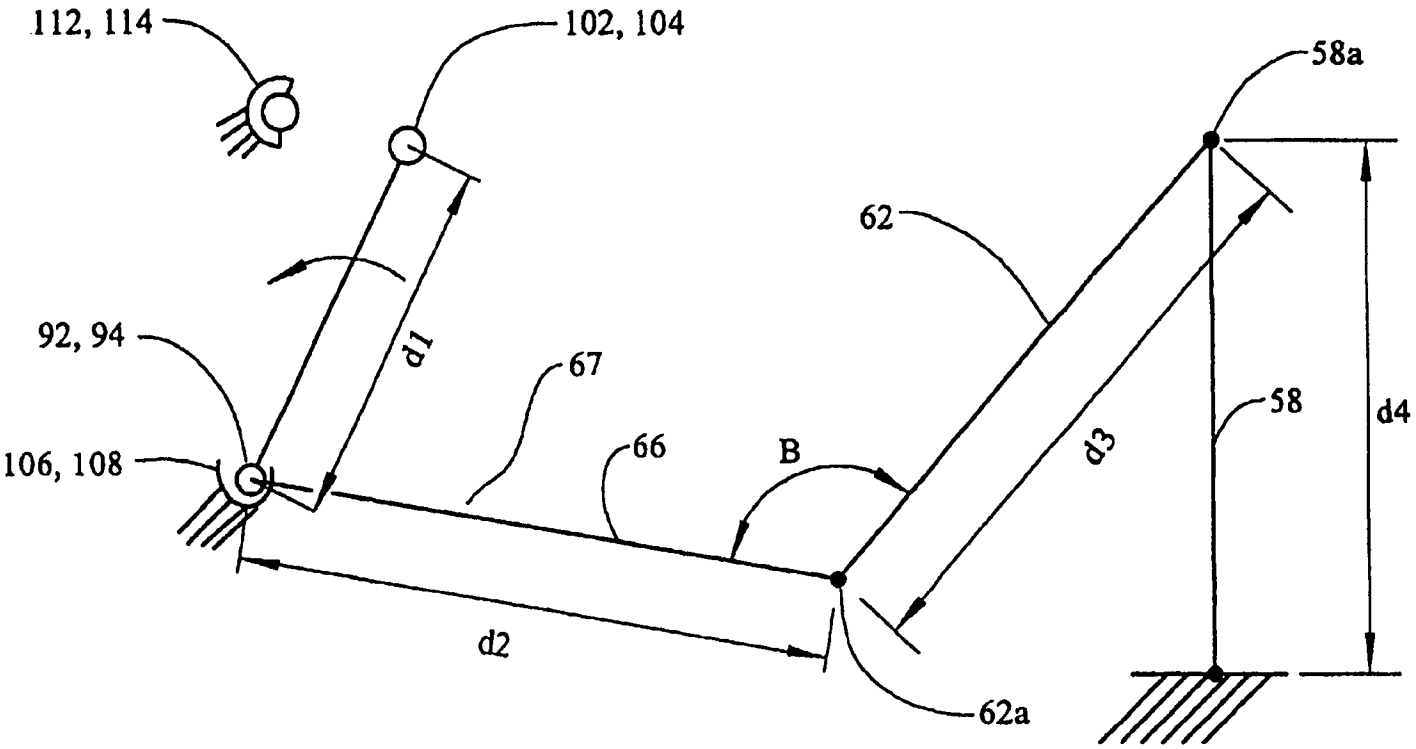
FIG. 5 is a schematic diagram of the backhoe attachment and mounting system of the tractor of FIG. 1.

FIG. 5 illustrates the geometric proportions that allow for the easy attachment of the backhoe attachment to the utility vehicle chassis 42. The bars 92, 94 are located at a distance d1 from the cylindrical bosses 102, 104. The seats 106, 108 are located at substantially the same distance to the receivers 112, 114.

The pivot point 62a of the intermediate arm 62 to the swivel arm 66 is located at a distance d2 to the bars 92, 94. The pivot point 58a between the intermediate arm 62 and the distal arm 58 of the backhoe attachment is located at a distance d3 to the pivot point 62a. The pivot point 58a is located at a distance d4 to a bottom 54b of the distal arm 58 with the bucket in a fully curled orientation as shown in FIG. 1A.

During the rotary movement of the backhoe attachment, the distal arm 58 remains substantially vertical. The intermediate arm 62 pivots clockwise about the pivot point 58a. The swivel arm 66 and the base assembly 67 pivot counterclockwise about the bars 92, 94 and the bosses rotate counterclockwise in the direction R about the bars 92, 94 to engage into the receivers 112, 114. An angle B between the swivel arm 66 and the intermediate arm 62 opens up.

According to one exemplary embodiment, the distances set forth in FIG. 5 are: d1=500 mm; d2=1125 mm; d3=2171 mm; and d4=1825 mm.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

The invention claimed is:

1. A rear-mounted implement mounting system for a utility vehicle and a rear-mounted implement, comprising:

at least one elongated connection member;

a first connection arranged between the utility vehicle and the rear-mounted implement, the first connection being engageable in a substantially vertical first direction and restraining separation of the utility vehicle and the rear-mounted implement along a second substantially horizontal direction that is substantially perpendicular to the first direction;

a second connection between the utility vehicle and the rear-mounted implement, said second connection at a distance above said first connection, said second connection being engageable in a tangential direction as said rear-mounted implement is rotated about said first connection and restraining separation of said utility vehicle and the rear-mounted implement along the tangential direction, said second connection comprising two laterally spaced-apart cylindrical bosses mounted together rigidly on a frame of said rear mounted implement, each boss having a first substantially horizontal bore therethrough along a common lateral axis, and two laterally spaced-apart receivers mounted on said utility vehicle, each receiver having a cylinder portion with a second substantially horizontal bore therethrough along a common lateral axis and an adjacent rim portion positioned to guide said cylinder portion into alignment with said boss, wherein after said rear mounted implement is rotated about said first connection, said first and second substantially horizontal bores of said bosses and cylinder portions are aligned to receive therein said at least one elongated connection member.

2. The mounting system according to claim 1, wherein said elongated connection member is a separate member from said utility vehicle and said rear-mounted implement.

3. The mounting system according to claim 2, wherein said first connection comprises seats arranged on said utility vehicle, and bars arranged on said rear-mounted implement which can be placed into said seats.

4. A rear-mounted implement mounting system for a utility vehicle and a rear-mounted implement, comprising:

a first connection arranged between the utility vehicle and the rear-mounted implement, the first connection being engageable in a first direction and restraining separation of the utility vehicle and the rear-mounted implement along a second direction that is substantially perpendicular to the first direction;

a second connection between the utility vehicle and the rear-mounted implement, said second connection at a distance from said first connection, said second connection being engageable in a tangential direction as said rear-mounted implement is rotated about said first connection and restraining separation of said utility vehicle and the rear-mounted implement along the tangential direction;

wherein said second connection comprises two cylindrical bosses [connected to said rear-mounted implement], said bosses having first open bores with axes thereof oriented laterally, and [said utility vehicle includes] two receivers each having a guide portion and an adjacent cylinder portion with a second open bore, and wherein said receivers are arranged to receive said cylindrical bosses and said guide portion are arranged to align said cylindrical bosses with said cylinder portions, said guide portions arranged outside of said cylinder portions *arranged outside of said cylinder portions* in a lateral direction; and two connector pins fit through respective pairs of first and second open bores of said cylindrical bosses and said cylinder portions to lock said rear-mounted implement attachment to said utility vehicle.

5. A rear-mounted implement mounting system for a utility vehicle and a rear-mounted implement, comprising:

a first connection arranged between the utility vehicle and the rear-mounted implement, the first connection being engageable in a first direction and restraining separation of the utility vehicle and the rear-mounted implement along a second direction that is substantially perpendicular to the first direction[;] *;* a second connection between the utility vehicle and the rear-mounted implement, said second connection at a distance from said first connection, said second connection being engageable in a tangential direction as said rear-mounted implement is rotated about said first connection and restraining separation of said utility vehicle and the rear-mounted implement along the tangential direction;

wherein said second connection comprises two cylindrical bosses [connected to said rear-mounted implement], said bosses having first open bores with axes thereof oriented laterally, and [said utility vehicle includes] two receivers each having a semicircular rim portion and an adjacent cylinder portion with a second open bore, and wherein said receivers are arranged to receive said cylindrical bosses to align said cylindrical bosses with said cylinder portions; and two connector pins fit through respective pairs of first and second open bores of said cylindrical bosses and said cylinder portions to lock said rear-mounted implement attachment to said utility vehicle;

wherein said semicircular rim portions are arranged outside of said cylinder portions in a lateral direction.

6. The mounting system according to claim 4, wherein said cylinder portions include pin receiving holes arranged in a radial direction and said connector pins each include a pin receiving hole arranged in a radial direction, and said second connection comprises retainer pins inserted through said pin retaining holes and said pin holes to lock said connector pins to said cylinder portions.

7. A utility vehicle comprising:

a rear-mounted implement including a base assembly, a swivel arm, an intermediate arm, a distal arm, and a bucket, said base assembly rotationally connected to said swivel arm, rotationally about a vertical axis, said swivel arm rotationally connected to said intermediate arm, rotationally about a lateral axis, said intermediate arm rotationally connected to said distal arm, rotationally about a lateral axis, and said distal arm rotationally connected to said bucket, rotationally about a lateral axis;

a hydraulic cylinder connected between said swivel arm and said intermediate arm and elongated or contracted to change the angle between said swivel arm and said intermediate arm;

a utility vehicle chassis supported on front and rear wheels, said chassis including rear-mounted implement-supporting seats extending rearward of the chassis and open upwardly, and receivers mounted above said seats and open in a rearward direction, said receivers being laterally spaced apart and each having a cylinder portion having a first lateral through bore;

said rear-mounted implement including bar members arranged to be fit substantially vertically into said seats, and boss members arranged to be fit into said receivers, each of said boss members having a second lateral bore therethrough; and two locking portions for locking said boss members into said receivers;

wherein said receivers each include a guide portion located adjacent to a respective cylinder portion, said guide portions arranged outside of said cylinder portions in a lateral direction, each said guide portion arranged to guide one boss member into a respective receiver with said second lateral through bore of said one boss member aligning with said first lateral through bore of said respective cylinder portion such that a respective locking portion can penetrate both said first lateral through bore of said respective cylinder portion and said second lateral through bore of said one boss member.

8. The utility vehicle according to claim 7, wherein said guide portions comprise semi-circular rim portions open in a rearward direction, and said locking portions comprise pins for fitting through said cylindrical bosses and said cylinder portions.

9. The utility vehicle according to claim 8, wherein said bosses are set at a distance from said bar members such that extension of the hydraulic cylinder causes rotation of said swivel arm about said bar members, and rotation of said swivel arm with respect to said intermediate arm, to precisely locate said bosses into said receivers.

10. A mounting system for a rear-mounted implement to a utility vehicle, comprising:

a utility vehicle chassis supported on front and rear wheels, said chassis including rear-mounted implement-supporting scats extending rearward of the chassis and open upwardly and receivers mounted above said seats and open in a rearward direction, said receivers being laterally spaced apart and each having a cylinder portion having a first lateral through bore;

said rear-mounted implement including bar members arranged to be fit substantially vertically into said seats, and boss members arranged to be fit into said receivers when said implement is rotated about said bar members, each of said boss members having a second lateral bore therethrough; and two locking portions for locking said boss members into said receivers;

wherein said receivers each include a guide portion located adjacent to a respective cylinder portion, said guide portions arranged outside of said cylinder portions in a lateral direction, each said guide portion arranged to guide one boss member into a respective receiver with said second lateral through bore of said one boss member aligning with said first lateral through bore of said respective cylinder portion such that a respective locking portion can penetrate both said first lateral through bore of said respective cylinder portion and said second lateral through bore of said one boss member.

11. The mounting system according to claim 10, wherein each said guide portion includes a curved rim portion open in a rearward direction, and said locking portions comprise connector pins for fitting through said cylindrical bosses and said cylinder portions.

12. The mounting system according to claim 11, wherein said cylinder portions include pin receiving holes arranged in a radial direction and said connector pins each include a pin receiving hole arranged in a radial direction, and said second connection comprises retainer pins inserted through said pin retaining holes and said pin holes to lock said connector pins to said cylinder portions.

* * * * *